US008726410B2

(12) United States Patent
Sathish et al.

(10) Patent No.: US 8,726,410 B2
(45) Date of Patent: May 13, 2014

(54) ATOMIC FORCE MICROSCOPY SYSTEM AND METHOD FOR NANOSCALE MEASUREMENT

(75) Inventors: Shamachary Sathish, Bellbrook, OH (US); Vijayaraghava Nalladega, Loveland, OH (US); Kumar V Jata, Dayton, OH (US); Mark P Blodgett, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/194,422

(22) Filed: Jul. 29, 2011

(65) Prior Publication Data

US 2012/0030846 A1 Feb. 2, 2012

Related U.S. Application Data

(60) Provisional application No. 61/369,357, filed on Jul. 30, 2010.

(51) Int. Cl.
*G01Q 60/50* (2010.01)
*G01Q 60/56* (2010.01)

(52) U.S. Cl.
USPC .................................. 850/46; 850/48; 850/49

(58) Field of Classification Search
USPC ............... 850/6, 25, 33, 46–49; 250/306–311
See application file for complete search history.

(56) References Cited

U.S. PATENT DOCUMENTS

| | | | |
|---|---|---|---|
| 5,144,833 A | 9/1992 | Amer et al. | |
| 5,196,701 A | 3/1993 | Foster et al. | |
| 5,319,977 A * | 6/1994 | Quate et al. | 73/606 |
| 5,331,589 A | 7/1994 | Gambino et al. | |
| 5,383,354 A | 1/1995 | Doris et al. | |
| 5,513,518 A * | 5/1996 | Lindsay | 73/105 |
| 5,619,139 A * | 4/1997 | Holczer et al. | 324/318 |
| 5,646,339 A | 7/1997 | Bayer et al. | |
| 5,670,712 A * | 9/1997 | Cleveland et al. | 73/105 |
| 5,744,704 A * | 4/1998 | Hu et al. | 73/105 |
| 5,880,360 A | 3/1999 | Hu et al. | |

(Continued)

FOREIGN PATENT DOCUMENTS

JP  07311251 A  * 11/1995
JP  08233833 A  *  9/1996

(Continued)

OTHER PUBLICATIONS

Roll, et al. "Distance Dependence of the Phase Signal in Eddy Current Microscopy", Thin Solid Films, vol. 516, Issue 23, 8630-8633 (2008).*

(Continued)

*Primary Examiner* — Jack Berman
*Assistant Examiner* — David E Smith
(74) *Attorney, Agent, or Firm* — AFMCLO/JAZ; Rebecca Greendyke

(57) ABSTRACT

An atomic force microscope (AFM) system capable of imaging multiple physical properties of a sample material at the nanoscale level. The system provides an apparatus and method for imaging physical properties using an electromagnetic coil placed under the sample. Excitation of the coil creates currents in the sample, which may be used to image a topography of the sample, a physical property of the sample, or both.

6 Claims, 4 Drawing Sheets

(56) References Cited

U.S. PATENT DOCUMENTS

| | | | |
|---|---|---|---|
| 5,900,729 A | 5/1999 | Moser et al. | |
| 5,936,237 A | 8/1999 | van der Weide | |
| 6,121,611 A * | 9/2000 | Lindsay et al. | 850/59 |
| RE37,299 E | 7/2001 | Amer et al. | |
| 6,642,517 B1 | 11/2003 | Ghislain et al. | |
| 6,818,891 B1 | 11/2004 | Hough et al. | |
| 6,880,386 B1 | 4/2005 | Krotil et al. | |
| 6,935,167 B1 | 8/2005 | Sahin et al. | |
| 7,009,414 B2 | 3/2006 | Worledge | |
| 7,074,340 B2 | 7/2006 | Lugstein et al. | |
| 7,095,020 B2 | 8/2006 | Hough et al. | |
| 2003/0122072 A1* | 7/2003 | Kaito et al. | 250/306 |
| 2003/0160170 A1 | 8/2003 | McMaster et al. | |
| 2005/0029450 A1* | 2/2005 | Hough et al. | 250/306 |
| 2005/0199852 A1* | 9/2005 | Takenoshita | 252/62.57 |
| 2005/0262930 A1* | 12/2005 | Shao et al. | 73/105 |
| 2006/0016251 A1* | 1/2006 | Hinterdorfer et al. | 73/105 |
| 2006/0272399 A1 | 12/2006 | Su et al. | |
| 2006/0283240 A1 | 12/2006 | Struckmeier et al. | |
| 2007/0089498 A1* | 4/2007 | Su et al. | 73/105 |
| 2007/0216412 A1* | 9/2007 | Tsuji et al. | 324/318 |
| 2007/0245815 A1* | 10/2007 | Proksch | 73/105 |
| 2008/0149832 A1 | 6/2008 | Zorn | |
| 2009/0007645 A1 | 1/2009 | Shih | |
| 2010/0219819 A1* | 9/2010 | Kimura et al. | 324/244 |
| 2011/0047662 A1* | 2/2011 | Rangelow et al. | 850/33 |

FOREIGN PATENT DOCUMENTS

| | | |
|---|---|---|
| WO | PCT/GB1997/002232 | 3/1998 |
| WO | PCT/US2000/001647 | 8/2000 |
| WO | PCT/US2008/007476 | 6/2008 |
| WO | PCT/US2008/063462 | 11/2008 |

OTHER PUBLICATIONS

Nalladega et al, "Development of Eddy Current Microscopy for High Resolution Electrical Conductivity Imaging Using Atomic Force Microscopy", Review of Scientific Instruments 79, 073705 (2008).*

Roll et al, "Distance Dependence of the Phase Signal in Eddy Current Microscopy", Thin Solid Films vol. 516, Issue 23, 8630-8633 (2008).*

B. Hoffman et al, "Eddy Current Microscopy," Applied Physics A, vol. 66 Supplement 409-413 (1998).

M.A. Lantz et al, "High Resolution Eddy Current Microscopy," Applied Physics Letters, vol. 78 Issue 3, 383-385 (2001).

Vijayaraghava Nalladega et al, Atomic Force Microscopy Based Eddy Current Imaging and Characterization of Composite and Nanocomposite Materials, Defense Technical Information Center, Mar. 2007.

Vijayaraghava Nalladega, "Scanning Eddy Current Force Microscopy Characterization of Electric, Magnetic, and Ferroelectric Properties with Nanometer Resolution," Dissertation Presentation at the University of Dayton, Jul. 7, 2009.

Steve Jeffery et al, "Quantitative Electrostatic Force Measurement in AFM," Applied Surface Science, vol. 157 280-284 (2000).

Alexander Olbrich et al, "Conducting Atomic Force Microscopy for Nanoscale Electrical Characterization of Thin SiO2," Applied Physics Letters, vol. 73 3114-3116 (1998).

J.A. Christman et al, "Piezoelectric Measurements with Atomic Force Microscopy," Applied Physics Letters, vol. 73 3851-3853 (1998).

Alexei Gruverman et al, "Scanning Force Microscopy for the Study of Domain Structure in Ferroelectric Thin Films," Journal of Vacuum Science & Technology B, vol. 14 602-605 (1996).

S. Hirsekorn et al, "On the Contrast in Eddy Current Microscopy using Atomic Force Microscopes," Surface and Interface Analysis 27, vol. 5/6 474-481 (1999).

Tino Roll et al, "Distance Dependence of the Phase Signal in Eddy Current Microscopy," Thin Solid Films, vol. 516, Issue 23, 8630-8633 (2008).

G. Binnig et al, "Atomic Force Microscope," Phys. Rev. Letters, vol. 56 No. 9, 903-933 (1986).

Iv Yaminsky et al, "Magnetic Force Microscopy," Russian Chem Rev, vol. 68 No. 3, 165-170 (1999).

Mark Blodgett et al, "Theoretical and Experimental Investigations of the Lateral Resolution of Eddy Current Imaging," Materials Evaluation, vol. 58, pp. 647-654 (2000).

Mark Blodgett et al, "Anisotropic Grain Noise in Eddy Current Inspection of Noncubic Polycrystalline Metals," Applied Phys Letters, vol. 72, pp. 1045-1047 (1998).

D.C. Hurley et al, "Atomic Force Acoustic Microscopy Methods to Determine Thin-Film Elastic Properties," J of App Phys, vol. 94 No. 4, pp. 2347-2354 (2003).

* cited by examiner

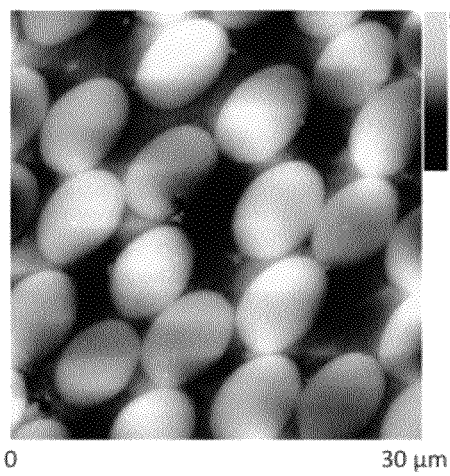
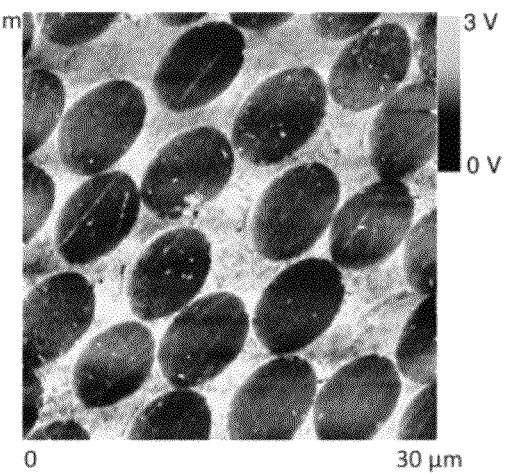
*Fig. 2A*      *Fig. 2B*
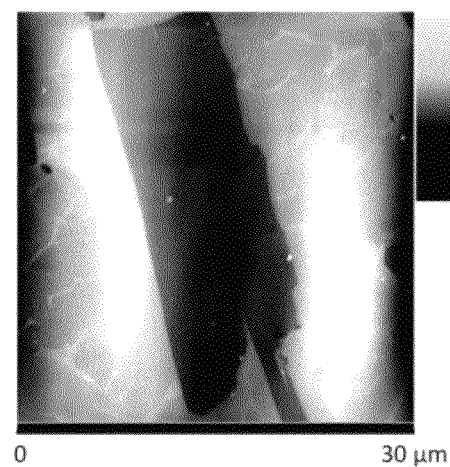
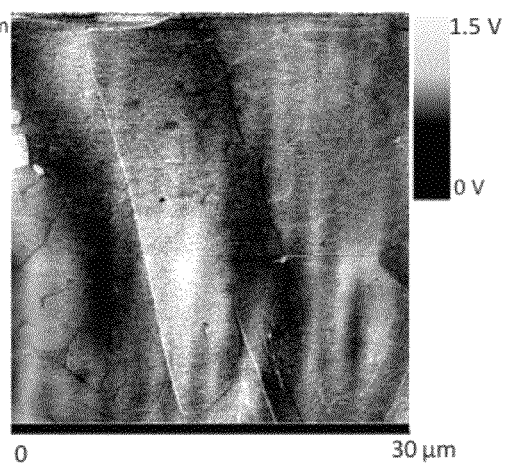
*Fig. 3A*      *Fig. 3B*

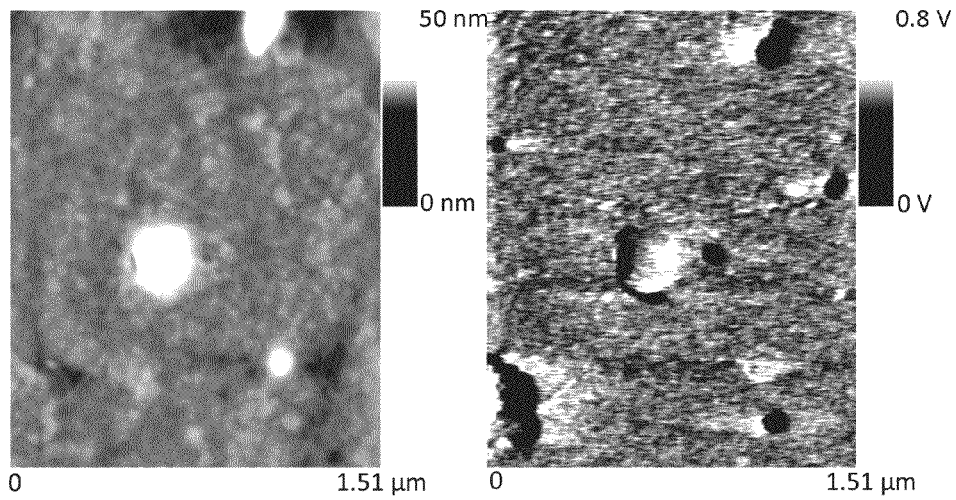
*Fig. 4A*  *Fig. 4B*
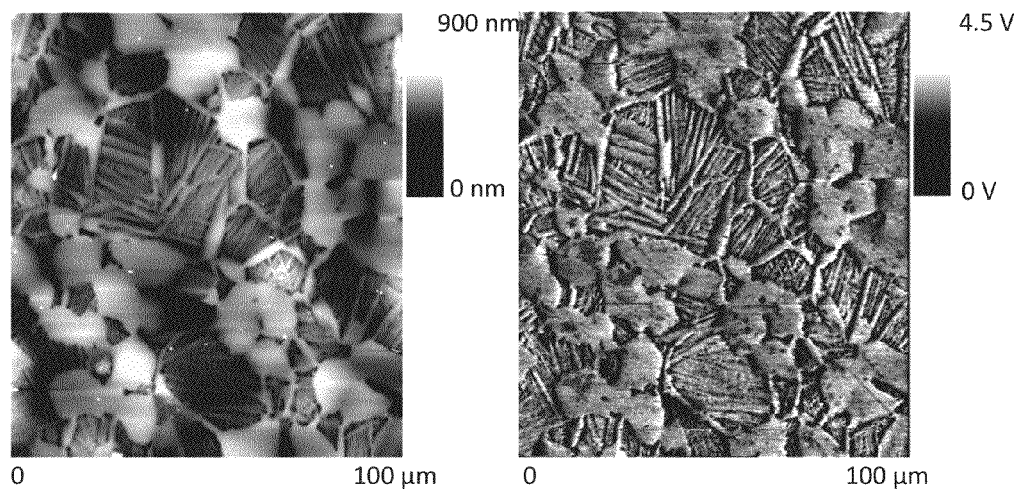
*Fig. 5A*  *Fig. 5B*

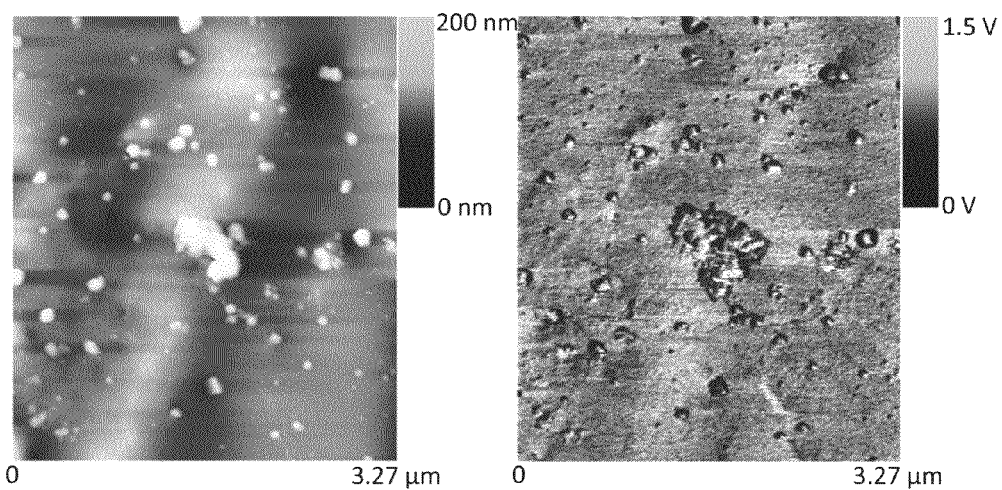
*Fig. 6A*  *Fig. 6B*

ATOMIC FORCE MICROSCOPY SYSTEM AND METHOD FOR NANOSCALE MEASUREMENT

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application is related to, and claims priority from, co-pending U.S. Provisional Patent Application No. 61/369,357, filed on Jul. 30, 2010, by inventor Shamachary Sathish, et al., and entitled "Atomic Force Microscopy Techniques for Nanoscale Measurement," which is hereby incorporated herein by reference in its entirety.

BACKGROUND OF THE INVENTION

1. Field of the Invention

This invention relates generally to the field of atomic force microscopy. More particularly, it relates to an atomic force microscopy system and method for imaging properties using currents induced within the sample material.

2. Description of the Related Art

Atomic force microscopy (AFM) is a type of scanning microscopy that provides high resolution, three-dimensional imaging at the atomic and molecular level. A cantilever terminating in a sharp, pointed tip is scanned across the surface of a sample, either in contact with or at a predetermined distance above the sample surface. A laser beam is focused on a portion of the cantilever during scanning, and a photodiode detector or other suitable detector collects the reflected light in order to detect minute deflections of the cantilever as the tip interacts with the sample surface. AFM is capable of measuring very small forces (less than 1 nanonewton) present between the tip and the sample surface and can be used to image surface topography as well as various physical properties of the sample.

To measure electric and dielectric properties, many currently available AFM techniques apply a bias voltage between a conductive tip and the sample. These devices require a tip made of conductive material and a bias voltage supply and setup. In addition, the voltage between the tip and the sample may become too high, causing damage to the sample. The application of a bias voltage to the sample may also alter the properties of many types of samples. Soft sample materials such as powders or biological materials are particularly prone to damage and alteration, which limits imaging of these materials.

Currently available AFM techniques that measure magnetic and ferroelectric properties have similar drawbacks. Most conventional magnetic force microscopy (MFM) systems require the use of a tip comprising magnetic material and a stiff cantilever having a spring constant of 2-40 Newtons/meter (N/m) or higher. The cantilever is coupled to an oscillator and vibrated a few nanometers above the magnetic sample. Based on interactions between the magnetic tip and the sample surface, the magnetic properties of the sample may be determined without the tip coming into contact with the sample surface. However, the resolution and sensitivity of MFM is generally poor as compared to other methods of AFM because the required stiffness of the cantilever and imaging in non-contact mode prevents the system from being as responsive to minor changes. This reduced responsiveness results in lower sensitivity and a poor quality, low resolution image. Increasing the magnetic field surrounding the tip increases the resolution but it may also affect the magnetization of the sample.

SUMMARY OF THE INVENTION

The present invention includes an atomic force microscope system for imaging a sample material with the sample material comprising a sample upper surface and at least one sample property. The atomic force microscope system comprises a cantilever with a reflective surface, a first end, and a second end, the first end having a pointed tip and the second end defining a length between the first end and the second end; a scanner coupled to the second end of the cantilever, wherein the cantilever is positioned such that the pointed tip is adjacent to the sample upper surface and such that the pointed tip is able to move across at least a portion of the sample upper surface; a laser positioned to emit a light focused on a portion of the reflective surface; a photodetector positioned such that a portion of the light reflected from the reflective surface is detected by the photodetector; a generator to generate a signal having a predetermined frequency and predetermined amplitude; an electromagnetic coil coupled to the generator to receive the signal and to excite the electromagnetic coil to create a time-varying magnetic field, wherein the time-varying magnetic field creates a secondary magnetic field within the sample material; and a phase sensitive detector to measure an output of the photodetector and an amplitude of the signal to generate a topographical image or at least one sample property image or both.

In one embodiment, the photodetector is a four-quadrant photodiode detector. In another embodiment, the signal is a radio frequency signal. In another embodiment, the electromagnetic coil is an air-core electromagnetic coil or a ferrite-core electromagnetic coil. In yet another embodiment, the pointed tip comprises a non-magnetic material, a magnetic material or a magnetic film-coated material.

The atomic force microscope system may be configured such that the length of the cantilever is substantially parallel to the sample upper surface and the pointed tip is substantially perpendicular to the sample upper surface. The atomic force microscope system may also be configured such that the length of the cantilever is substantially perpendicular to the sample upper surface and the pointed tip is substantially perpendicular to the sample upper surface. The atomic force microscope system may be used to measure various sample properties, including but not limited to electrical, dielectric, ferroelectric, magnetostrictive, magneto-acoustic, or magneto-elastic properties.

The present invention further includes a method of using an atomic force microscope system to generate an image of a sample material. The method comprises placing the sample material near an electromagnetic coil; supplying a signal to the electromagnetic coil such that the signal creates a time-varying magnetic field, wherein the sample material intersects the time-varying magnetic field such that a second magnetic field is induced within the sample material; varying the second magnetic field by altering at least one of an amplitude and a frequency of the signal; focusing a laser on a reflective surface of a cantilever; raster-scanning the sample material with a pointed tip of the cantilever such that the pointed tip is in contact with a sample upper surface; detecting a portion of the laser that is reflected from the reflective surface using a photodetector; collecting an output of the photodetector and an amplitude of the signal to the electromagnetic coil; and generating a topography image of the sample upper surface and at least one sample property image by comparing the output of the photodetector and the amplitude of the signal to the electromagnetic coil.

In one method, the pointed tip is non-magnetic. Where the sample material is conductive, the sample property includes magneto-acoustic. Where the sample material is magnetic, the sample property includes magnetostriction. In another method, the pointed tip is magnetic. Where the sample material is ferroelectric, the sample property includes electrostriction.

In another method, the topography image and sample property image may be obtained simultaneously.

The method further includes positioning the cantilever to a predetermined distance above the sample upper surface; and raster-scanning the sample material with the cantilever at the predetermined distance above the sample upper surface. Where the sample material is conductive, the sample property includes electrical conductivity or resistivity. Where the sample material is dielectric, the sample property includes dielectric polarization.

BRIEF DESCRIPTION OF THE DRAWINGS

FIG. 2A is an image of the surface topography of carbon fibers in a non-conductive matrix.

FIG. 2B is an image of the electrical conductivity of carbon fibers in a non-conductive matrix.

FIG. 3A is an image of the surface topography of a titanium alloy.

FIG. 3B is an image of the electrical conductivity of the titanium alloy.

FIG. 4A is an image of the surface topography of a potassium titanyl phosphate sample.

FIG. 4B is an image of the ferroelectric properties of a potassium titanyl phosphate sample.

FIG. 5A is an image of the surface topography of a dual-phase polycrystalline titanium sample.

FIG. 5B is an image of the magneto-acoustic properties of a dual-phase polycrystalline titanium sample.

FIG. 6A is a high-magnification image of the surface topography of a nanocrystalline FeSiBNbCu alloy (FINEMET) magnetic ribbon sample.

FIG. 6B is a high-magnification image of the magneto-elastic properties of a nanocrystalline FINEMET magnetic ribbon sample.

DETAILED DESCRIPTION OF THE INVENTION

Figure 1:
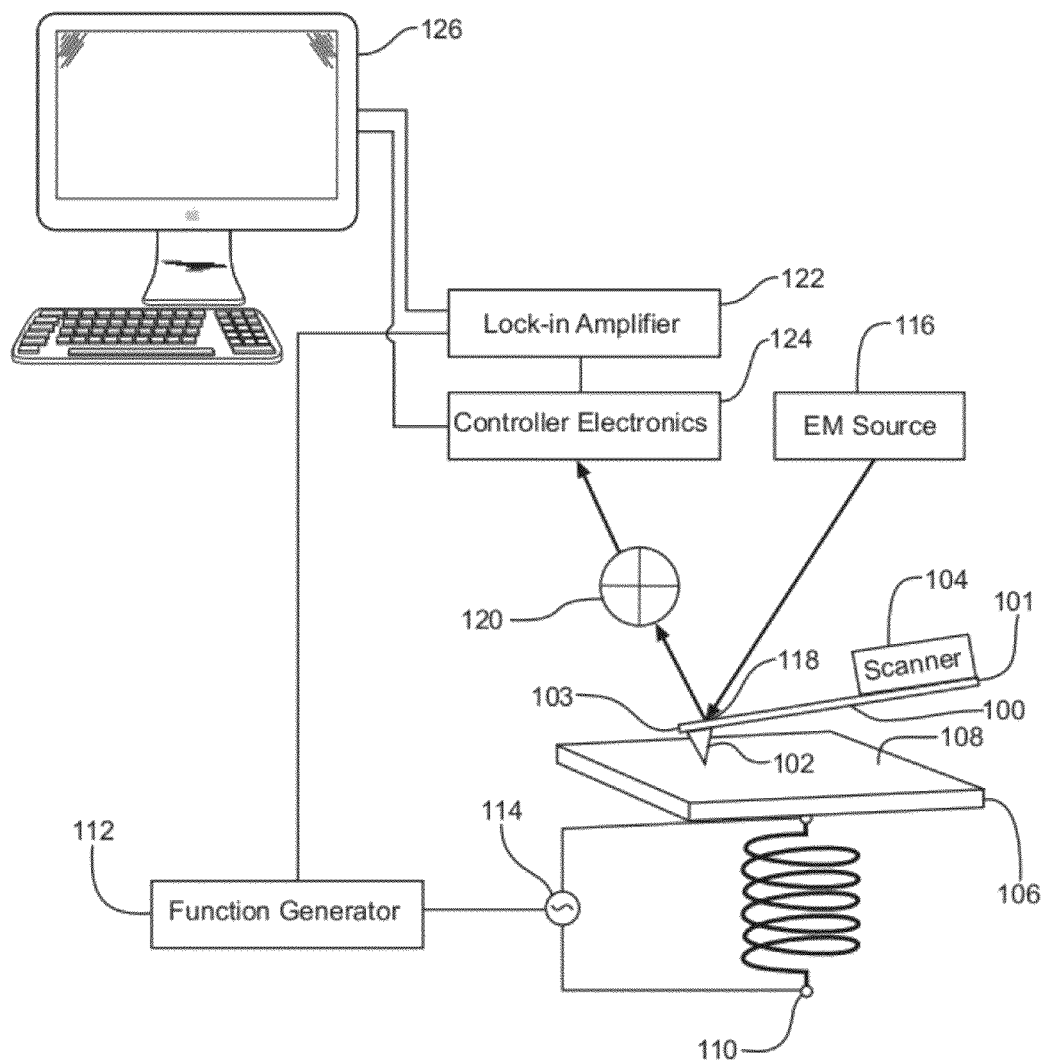
FIG. 1 is a schematic of one embodiment of the AFM system.

The present invention provides an atomic force microscopy (AFM) system capable of imaging multiple physical properties of a sample material at the nanoscale level with a minimum amount of alteration to the system, thereby saving valuable time and equipment costs. The present invention provides an apparatus and method for imaging physical properties using an electromagnetic coil placed under the sample. Excitation of the coil creates currents in the sample, which may then be used to image multiple properties including elastic, electrical, dielectric, thermal, and magnetic properties. The system allows the use of softer cantilevers, which provides higher sensitivity to small variations in the interaction forces at the local level. In addition, the system does not require the use of bias voltage and a conductive tip to image electrical properties, nor does it require the use of a magnetic tip to image magnetic and magneto-elastic properties of the sample.

FIG. 1 shows one embodiment of an AFM system setup as described in the present invention. A cantilever 100 may be positioned above a sample 106. One end of the cantilever 103 comprises a sharp tip 102. The tip and cantilever may be machined as one continuous piece comprising the same material, or the tip may alternatively comprise a second material such as a diamond chip, metallic coating, or other suitable material that may be integrated into or coated onto the cantilever.

The tip may be any shape, and as depicted in FIG. 1, the tip may be a conical or flat pyramidal shape to provide optimal scanning accuracy and resolution. In general, a cantilever with a smaller tip and a lower spring constant translates into higher sensitivity to minute variations and a higher resolution image. For example, the cantilever may be comprised of a softer material such as silicon or silicon nitride to give it a lower spring constant. The cantilevers used experimentally generally had tips with a nominal diameter of about 10-20 nm and an average spring constant of about 0.1 N/m with spring constants falling between about 0.05 N/m and about 1 N/m and an average resonant frequency of about 25 kHz or between about 10 kHz and about 1 MHz or higher.

The tip may be comprised of a non-magnetic material such as silicon or silicon nitride. The tip may also be comprised of a magnetic material or a magnetic film coating. Suitable materials include cobalt/chromium alloys, nickel and nickel alloys. The tip may further be comprised of a conductive or non-conductive material. Conductive materials commonly include platinum alloys such as chromium/platinum and platinum/iridium and silver alloys such as silver/gallium.

The other end of the cantilever 101 may be coupled to a scanner 104, which may be computer controlled. Many AFM systems use a computer-controlled piezoelectric scanner, which allows precise positioning of the pointed tip relative to the sample upper surface along the x, y, and z axes. This high level of adjustability allows the AFM system to achieve precise and high-quality imaging.

A sample 106 may be positioned beneath the cantilever 100 and tip 102. In one embodiment, the cantilever 100 is substantially parallel to a sample upper surface 108 that is to be imaged. In another embodiment (not shown), the cantilever may be positioned such that it is substantially perpendicular to the sample upper surface that is to be imaged. The cantilever 100 may also be positioned such that the tip 102 is substantially perpendicular to the sample upper surface 108 and so that the tip 102 is adjacent to the sample upper surface 108. The tip may be positioned such that it is exactly perpendicular (90° angle) with relation to the sample upper surface. The tip may also be positioned such that it forms an angle between 65° and 115° with relation to the sample upper surface. The cantilever may be positioned such that it is exactly perpendicular (90° angle with relation to the sample upper surface) or exactly parallel (equidistant from the sample upper surface at all points). The cantilever may also be positioned such that it is 20-40° from perpendicular or parallel.

The system may optionally comprise a sample stage (not shown) on which the sample material is placed near the electromagnetic coil. Sample stages suitable for multiple types of samples are commercially available from Digital Instruments Inc., Agilent Technologies Inc., and other providers of AFM systems and components.

To obtain an image of a topography of the sample upper surface or to measure a physical property, the scanner 104 raster-scans the cantilever 100 and tip 102 across a portion of the sample upper surface 108. When the tip 102 is scanned across the sample upper surface 108, attractive or repulsive forces present between the tip 102 and the sample surface 108 such as van der Waals forces, capillary forces, and magnetic forces act on the cantilever 100, which leads to a measurable deflection of the cantilever 100. The interaction force between the tip 102 and the sample upper surface 108 is measured according to Hooke's law, $F=k\Delta z$, where k is the cantilever spring constant and $\Delta z$ is the vertical displacement of the cantilever.

In another embodiment (not shown), the scanner may be coupled to a sample stage on which the sample sits. During scanning, the tip remains stationary, and the scanner moves the sample stage containing the sample material, thereby allowing the tip to raster-scan across the sample upper surface.

The cantilever and tip may be operated in several different modes. In contact or static mode, the tip is held within a few angstroms of the sample surface, where molecular interactions and forces between the tip and the sample surface create a slight repulsive force. The tip is scanned along the surface with the cantilever deflecting up and down and side to side in response to the surface topography and physical properties of the sample material. In order to obtain a high resolution image, a cantilever made from a material that is soft enough to be deflected by and respond to very small forces may be used. In non-contact or dynamic mode, the cantilever may be held at a predetermined distance above the sample during scanning. The cantilever may optionally be vibrated at a predetermined frequency. Because of the attractive forces between the sample and the tip at this distance, a relatively stiff cantilever with a spring constant of 2 N/m or higher is generally used to prevent the tip from contacting the sample. A third mode, tapping mode, involves intermittent contact between the tip and the sample surface.

The sample 106 may be situated near the electromagnetic coil 110 such that the sample upper surface 108 faces the cantilever 100. As shown in FIG. 1, the sample 106 may be placed near an end of the electromagnetic coil 110. In another embodiment, the sample may also be placed on a sample stage near the electromagnetic coil (not shown). Any type of suitable electromagnetic coil may be used. The coil may be of differing shapes including square, rectangular, circular, or elliptical and may be created using different winding methods including spiral winding, meander winding, and parallel winding (bifilar coil). The coil may also be flat or substantially cylindrical. In the example in FIG. 1, a simple air-core electromagnetic coil is shown. An air-core coil comprises any electromagnetic coil without a magnetic core. The air-core coil may be comprised of self-supporting coiled wires, in which case the center is empty, or the coil may be wound around an insulating core such as plastic, ceramic, or other appropriate material or combination thereof. The electromagnetic coil may alternatively have a ferrite core around which the wiring is wound. The ferrite core may comprise a ferromagnetic material such as iron, nickel, cobalt, or an alloy thereof.

The coil used in the experiments described herein was a substantially circular, self-supporting air-core electromagnetic coil with a radius of about 6 mm. It was wound with about 100 turns of 36 gauge copper wire. To avoid edge effects caused by expansion of the eddy currents, the diameter of the coil should be smaller than the sample. The coil may be at least 0.635 centimeters from an edge of the sample and may be 50-75% smaller than the length and width dimensions of the sample material.

A function generator 112 may be coupled to the electromagnetic coil 110 such that a signal 114 of appropriate frequency and amplitude excites the electromagnetic coil 110. The electromagnetic coil 110 may contain a receiver (not shown) designed to receive the signal 114. The signal 114 may be in the form of a radio frequency signal or other signal with the appropriate frequency and amplitude. The radio frequency signal may have a frequency of about 3 kHz to about 300 GHz, with many experimentally useful frequencies falling between 20 and 120 kHz. The signal 114 excites the electromagnetic coil 110, which generates a current within the coil. The current flowing through the electromagnetic coil 110 generates a time-varying magnetic field around the coil, and the sample 106 may be positioned such that it intersects the axial magnetic field near one end of the electromagnetic coil 110. The time-varying magnetic field created by the electromagnetic coil 110 induces currents within the sample 106. The tip 102 may then be raster-scanned across the sample upper surface 108 in order to obtain an image of the surface topography or a physical property of the sample or both.

The setup in FIG. 1 further comprises an electromagnetic (EM) source 116. The EM source 116 may be positioned such that it is focused on a reflective surface of the cantilever 118. The EM source may be a laser or any other suitable source of electromagnetic radiation. The laser used in the experiments described herein was a helium-neon (He—Ne) gas laser. The reflective surface of the cantilever 118 onto which the EM source 116 is focused may be coated in gold, aluminum, or a similar coating to enhance reflectivity.

The example in FIG. 1 further comprises a photodiode detector 120 that may be positioned such that it receives all or a portion of the light reflected off of the reflective surface of the cantilever 118 during scanning. A split diode detector is generally used so that changes in the position of the reflected light can be measured and recorded. The photodiode detector 120 depicted in FIG. 1 is a four-quadrant position sensitive photodiode detector with four, about-equal sectors of about 90 degrees. Where the cantilever is substantially parallel to the sample upper surface, the EM source may be focused on an upper surface of the cantilever (a surface opposite the pointed tip) as depicted in FIG. 1. Where the cantilever is positioned such that it is substantially perpendicular to the sample upper surface (not shown), the EM source may be positioned such that it is focused on any surface of the cantilever that allows the reflected light to be detected by the photodiode detector.

As the tip 102 is scanned across the sample upper surface 108, the cantilever 100 moves up and down and side to side in response to minute variations in sample topography and/or changes in a sample physical property. These oscillations in the cantilever 100 cause the light beam reflected from the reflective surface of the cantilever 118 to change position across the quadrants of the photodiode detector 120. The photodiode detector 120 detects vertical and horizontal motion of the cantilever 100 by measuring the movement of the reflected light beam across the various quadrants of the photodiode detector 120.

The setup in FIG. 1 further comprises a lock-in amplifier 122 and controller electronics 124. The voltage output of the photodiode detector 120 and the signal 114 that excites the electromagnetic coil 110 are fed into the lock-in amplifier 122 which measures the amplitude and phase of signals buried in the noise. The lock-in amplifier, also known as a phase sensitive detector, acts as a narrow band pass filter that removes much of the unwanted noise, while passing through the signal that is to be measured. The frequency of the signal to be measured, and hence the passband region of the filter, may be set by a reference signal, which has to be supplied to the lock-in amplifier along with the unknown signal. The reference signal must be at the same frequency as the modulation of the signal to be measured.

The lock-in amplifier 122 measures the differential amplitude and the difference in the phase between the signal 114 to the electromagnetic coil 110 and the output from the photodiode detector 120. The difference in amplitude and the phase detected by the lock-in amplifier 122 is proportional to the level of electrical conductivity, magnetostriction, or other physical property of the sample beneath the tip 102. The output of the lock-in amplifier 122 and the controller electronics 124 are fed into a computer 126 to generate a surface topography image or an image based on physical properties of the sample 106 or both. Where the cantilever 100 and tip 102 are used in contact mode, the surface topography and physical property images may be obtained simultaneously.

The controller electronics 124 comprise an AFM scanning controller (not shown) and a signal access module and filters (also not shown). The scanning controller may be used to control the scanner to achieve precise scanning of portions of the sample upper surface. The signal access module and filters allow the user to access internal AFM signals in order to measure various physical properties. The scanning controller and signal access module and filters are commercially available from Digital Instruments Inc., Agilent Technologies Inc., and other providers of AFM systems and components.

A feedback control system (not shown) may be used to keep the deflection of the cantilever 100 near constant. By measuring the signal difference in the four quadrants of the photodiode detector 120 the amount of deflection may be correlated with a height of the cantilever 100 above the sample upper surface 108. The feedback mechanisms employed in the system enable the scanner 104 to maintain the tip 102 at a constant force (to obtain height information) or a constant height (to obtain force information) above the sample upper surface 108. In constant force mode, as the tip 102 is raster-scanned across the sample upper surface 108, the scanner 104 adjusts the tip-sample separation so that a constant deflection set point is maintained. If the tip 102 encounters a large variation in height or physical property during scanning, the cantilever deflection will increase or decrease, and the feedback electronics will alter the z height of the scanner to bring the cantilever deflection back to the set deflection point.

One example of a commercially available AFM system is the DI Dimension 3000 AFM system by Digital Instruments Inc. The Dimension 3000 is a flexible system that allows for scanning in all three modes as well as scanning of multiple types of samples.

Imaging of Electrical and Dielectric Properties

For a conductive sample, the currently disclosed AFM system may be used to measure electric and dielectric properties. Electrical currents called eddy currents are induced in conductive samples in response to exposure to the oscillating or time-varying magnetic field created by excitement of the electromagnetic coil underneath the sample. Eddy currents are closed loops of induced current circulating in planes perpendicular to the magnetic flux. The circulating electrons in the sample swirl in such a way as to create a magnetic field within the sample material that is opposite to the magnetic field that created the current. The strength of the induced currents decreases exponentially based on the distance between the coil and the sample surface. The depth that the currents penetrate into the sample material is affected by the frequency of the excitation signal and the physical properties of the sample.

To image electrical and dielectric properties of conductive materials, the tip may be magnetic. To obtain a topographical image of the sample surface, the magnetic tip may be first raster-scanned across the sample surface in contact mode. To obtain an image of the electrical or dielectric properties, the cantilever may then be lifted to a predetermined height. Scanning in non-contact mode may be performed at a height of about 50-100 nm. The magnetic tip may be raster-scanned across the surface of an insulator sample in non-contact mode in order to establish a base line (the insulator force or $F_{Ins}$). The insulator may then be replaced with the conductive sample, and the tip may be scanned in non-contact mode across the surface to collect the measured force ($F_M$). An insulator allows the magnetic field generated by the electromagnetic coil to pass through unabated, while the eddy currents in a conductive material shield a significant portion of the magnetic field. The difference between $F_{Ins}$ and $F_M$ is directly dependent on the electrical conductivity of the sample, leading to variations in force as conductivity changes across the sample.

As the conductivity of the sample material changes, the magnitude of the eddy current forces changes. The local interactions between the primary magnetic field generated by the electromagnetic coil and the opposing magnetic field generated by the induced currents in the sample produce oscillations of the magnetic tip. Unlike traditional AFM non-contact modes, the presently disclosed AFM system may be operated without vibrating the cantilever because a magnetic tip may be used. As shown in FIG. 1, a source of electromagnetic radiation may be positioned above the cantilever such that the beam of light is focused on a reflective surface of the cantilever. The source of electromagnetic radiation may comprise a laser or other suitable source of light. All or part of the light reflected from the back of the cantilever may be absorbed by a detector such as the four-quadrant photodiode detector depicted in FIG. 1. The cantilever's vertical deflection may be detected by displacement of the reflected light between the top and bottom photodiodes, while horizontal motion may be detected by displacement of the reflected light between the top photodiodes or between the bottom photodiodes.

For conductive samples, the amplitude of the oscillation of the cantilever is proportional to the conductivity of the sample material. The presence of the electromagnetic coil beneath the sample stage allows the user to independently adjust the intensity of the eddy current fields within the sample. The amplitude and/or frequency of the signal may be varied to increase or decrease the amount of eddy currents circulating in the material. The amount of deflection of the cantilever is directly proportional to the eddy current forces in the sample material, which in turn depends on the conductivity of the material.

The process for dielectric materials is similar. When a dielectric is placed in the time-varying electric field, electric charges do not flow through the material as in a conductor but rather shift slightly from their average equilibrium positions. This slight shift causes dielectric polarization. Because of dielectric polarization, positive charges are displaced toward the field, and negative charges shift in the opposite direction. The interaction between the dipoles in the dielectric sample and the time-varying magnetic field produced by the electromagnetic coil causes the magnetic cantilever to oscillate. The frequency of the cantilever oscillation is a function of the local dielectric properties of the sample material.

FIGS. 2A and 2B respectively show the topography and electrical conductivity images obtained on a carbon fiber composite sample. FIG. 2A is an image of the surface topography of the sample. The lighter, roughly circular regions correspond to higher surface heights, in this case the carbon fibers, while the darker regions correspond to lower areas, in this case the polymer matrix. The surface height of the image is approximately 500 nm with a scan area of 30 μm×30 μm, and the coil is excited with a radio signal with a frequency of 85 kHz. The spring constant of the cantilever used is about 0.18 N/m.

FIG. 2B is an image of the electrical conductivity of the same area. In this figure, the dark, roughly circular areas (the carbon fibers) correspond to areas of high conductivity, while the lighter areas (the polymer matrix) correspond to areas of lower conductivity. The carbon fibers and the polymer matrix exhibit vastly different electrical resistivity (0.006 Ω-cm and $1\times10^{15}$ Ω-cm, respectively), and this large variation manifests itself in the sharp contrast seen in FIG. 2B. The polymer matrix is similar to an insulator that allows the magnetic field to pass through it without damping, thereby producing a large amplitude of oscillation in the cantilever and magnetic tip and significant output voltages from the photodiode detector. In contrast, the carbon fibers are strongly conductive, and the magnetic field from the electromagnetic coil induces currents within the fibers. The magnetic field from the coil is reduced, resulting in reduced amplitude of oscillations in the cantilever and reduced output from the photodiode detector.

FIGS. 3A and 3B respectively show images of topography and electrical conductivity for a titanium alloy, Ti-6Al-4V. This alloy was chosen because it exists in dual crystal structures: hexagonal and closely-packed (α-phase) and body-centered and cubic (β-phase). Unlike the carbon fibers and polymer matrix in FIGS. 2A and 2B, the two phases of the titanium have similar conductivity, which tests the limit of the conductivity imaging capabilities of the system disclosed in FIG. 1. The surface height of the α-phase grains is about 80 nm, and the coil is excited with a radio signal with a frequency of 92 kHz. The scan area is 30 μm×30 μm. The α-phase grains have a size of about 10-20 μm. The Ti-6Al-4V alloy also contains fine lamellar α+β platelets.

The topography image in FIG. 3A shows the grains clearly, while the boundaries in the electrical conductivity image of FIG. 3B are not as clear. The reason is that the hexagonal close-pack (HCP) of the α-phase grains gives them electrical anisotropy, meaning that their conductivity is directionally dependent. When the grains are oriented in different directions, the electrical conductivity is different along that particular direction, which produces variations in the induced currents in the sample. However, if the grains are oriented in the same direction, there is no variation in the electrical conductivity or induced currents, which provides no contrast difference between the grains. In the electrical conductivity image in FIG. 3B, only some of the grain boundaries may be seen clearly.

Imaging of Electrostrictive Properties

The exemplary setup in FIG. 1 may further be used to image the electrostriction properties of ferroelectric, piezoelectric, and dielectric materials. A ferroelectric material is special type of dielectric that may be given a permanent electric polarization upon exposure to an electric field, which is referred to as spontaneous polarization. For a system to be considered ferroelectric, it must be possible for the polarization to be reversed by the application of the external electric field. Electrostriction is the generation of strain in ferroelectric or dielectric materials when an external electric field is applied to the material. This phenomenon is similar to that of magnetostriction in ferromagnetic materials. A piezoelectric material is one that generates an internal charge upon the application of mechanical stress. When an electric field is applied to a piezoelectric material, strains are generated in the material due to the converse piezoelectric effect, which causes the atoms in the material to move slightly.

The strains induced by interaction between the magnetic field generated by the electromagnetic coil and the polarized states of the ferroelectric or dielectric material may be measured by a magnetic tip in contact mode. Because a dielectric or ferroelectric sample is also conductive, conductivity may simultaneously be measured when the material is scanned in contact mode.

FIGS. 4A and 4B respectively show an image of the surface topography and ferroelectric properties of potassium titanyl phosphate (KTP), an ionic conducting ferroelectric material. A cantilever with a spring constant of 0.1 N/m and a tip with a diameter of 20 nm are used in contact mode. The scan area is 1.51 m×1.51 m, and the coil is excited with a radio signal with a frequency of 90 kHz. The maximum surface height is 50 nm. Because the image is obtained in contact mode, topography and ferroelectric properties may be obtained simultaneously. FIG. 4A is a topographical image of the surface of the KTP sample. FIG. 4B is an image obtained based on the ferroelectric interactions between the magnetic tip and the induced currents in the sample. FIG. 4B shows dark, roughly circular features not seen in FIG. 4A. Because these features are not visible on the topographic image, they may be ferroelectric domains formed upon exposure to the magnetic field of the electromagnetic coil. It should be noted that care must be taken in analysis of the results and interpretation of the contrast because conductivity interactions will also be imaged using this method.

Imaging of Magneto-Acoustic Properties

To image magneto-acoustic properties of conductive sample materials, the same exemplary setup as in FIG. 1 may be used with a non-magnetic tip. When a conductive material is placed within the time-varying magnetic field generated by the electromagnetic coil, the induced flow of electrons collides with the crystal lattice structure of the sample. These collisions produce acoustic waves in the sample, which may be measured by the non-magnetic tip in contact mode without the need for an amplifier and/or transducer.

FIG. 5A shows the surface topography of Ti-6Al-4V, the conductive titanium alloy that was utilized and described above in FIGS. 3A and 3B to obtain conductivity images. FIG. 5B shows an acoustic field image. A cantilever with a spring constant of 0.12 N/m is operated in contact mode. The image is obtained with a scan area of 100 μm, and the coil is excited with a radio signal with a frequency of 85 kHz. The grain boundaries are shown with much better contrast than in the conductivity images, but there is little contrast between the α- and β-phases, which suggests that the two phases have similar local magneto-acoustic properties. The grain boundaries appear with better contrast because at the boundary, the acoustic amplitudes are much greater than in the grain. These images demonstrate that variations in acoustic fields may be obtained to measure local elasticity and stiffness variations without the use of a magnetic tip.

Imaging of Magnetostrictive Properties

Finally, the exemplary setup in FIG. 1 may be used to image magnetostriction properties of ferromagnetic materials. Ferromagnetic materials have an internal structure that is divided into domains, which are regions of uniform magnetic polarization. When a ferromagnetic sample is placed in the time-varying magnetic field generated by the electromagnetic coil, strain is generated by the magnetic force acting on the material as a whole and on the magnetization of each of the domains, as well as by the electromagnetic forces between the magnetization and an eddy current. The boundaries between the domains shift, and the domains rotate, both of which cause strain and a minute change in the material's dimensions. The magnetostrictive strains cause the cantilever to oscillate with an amplitude that is proportional to the local magnetostrictive properties of the material.

FIGS. 6A and 6B respectively show high magnification surface topography and magnetostrictive images of a nanocrystalline FeSiBNbCu alloy (FINEMET) magnetic ribbon sample. A cantilever with a non-magnetic tip made of $Si_3N_4$ and a spring constant of 0.1 N/m is operated in contact mode. The image is obtained with a scan area of 1.33 μm×1.33 μm, and the coil is excited with a radio signal with a frequency of 58 kHz. The topographical image in FIG. 6A shows the nanocrystals embedded in the amorphous matrix. The domains may be clearly seen in both figures. Within the domains, the magnetostriction is saturated, which gives rise to a deformation that is dependent on the magnetization direction of the domain. At the domain wall, the magnetic moment changes direction, resulting in deformation of the material. The magnetization of the sample is in-plane, while the external magnetic field is perpendicular to that plane. These forces result in a larger deflection in the cantilever near the domain walls and a sharp contrast in the magnetostriction image in FIG. 6B.

The system in FIG. 1 provides many advantages over conventional eddy current non-destructive evaluation (NDE) methods. In traditional eddy current imaging, one electromagnetic coil is used to generate eddy currents in the sample, while a probe comprising a second electromagnetic coil is scanned across the sample surface. By measuring the change in impedance in the probe or pick-up coil, cracks and gross defects in the material may be detected, and electrical conductivity may be imaged. However, traditional eddy current methods are useful primarily to measure electrical conductivity of bulk materials on a macroscale. Coil sizes range from few hundred microns to several mm, and because spatial resolution is driven by the size and configuration of the pick-up coil, the images obtained by conventional eddy current methods have a spatial resolution that is generally insufficient for imaging of nanomaterials. Defects smaller than the size of the pick-up coil generally cannot be detected.

In addition, the presently disclosed invention provides a system and method for imaging properties of sample materials that were not previously feasible using many conventional AFM devices and techniques. For example, the currently disclosed system and method may be used to image liquids, biological materials such as proteins and nucleic acids, and other soft sample materials, which are defined as any sample material having a hardness less than that of the material comprising the tip. In many cases, currently available techniques that require the use of a bias voltage or strong magnetic field would likely destroy or alter such fragile sample materials. It will be appreciated that the presently disclosed invention may be applicable to needs in many fields, including but not limited to biotechnology, bioengineering, materials science and characterization, and other fields requiring NDE methods at nanometer scale resolution.

The present invention further comprises a method of using an AFM system to generate images of the topography and physical properties of a sample material. The exemplary setup in FIG. 1 may be used. A sample material may be placed near an electromagnetic coil. The sample material may be placed near an end of the electromagnetic coil. A signal of appropriate amplitude and frequency, such as a radio frequency signal, may be supplied to the electromagnetic coil by a signal generator, which excites the electromagnetic coil and generates currents within the coil. The current running through the electromagnetic coil creates a time-varying magnetic field. The sample material is placed so that it intersects the magnetic field of the electromagnetic coil, which induces currents within the sample material and creates a second magnetic field opposite to that of the coil's magnetic field. The second magnetic field may be controlled by altering the amplitude or frequency of the signal.

Using an AFM system such as the one depicted in FIG. 1, the tip of the cantilever may then be raster-scanned across the sample upper surface in contact mode. A laser or other appropriate source of electromagnetic radiation is focused on a reflective surface of the cantilever such that a portion of the laser light reflected from the reflective surface is detected by a photodetector. The photodetector may be a four-quadrant photodetector. The lock-in amplifier collects an output of the photodetector and an amplitude of the signal to the electromagnetic coil, both of which are compared to calculate and generate an image of a topography of the sample upper surface and a physical property of the sample material.

The pointed tip of the cantilever may be non-magnetic or magnetic. A non-magnetic tip may be operated in contact mode to measure magneto-acoustic properties in a conductive sample and magnetostriction in a magnetic sample material. A magnetic tip may be operated in contact mode to measure electrostriction in a ferroelectric sample material.

In accordance with one aspect of the invention, the topography and sample property may be obtained simultaneously.

In accordance with another aspect of the invention, the method further includes raising the cantilever with a magnetic tip to a predetermined distance above the sample upper surface and raster-scanning the sample upper surface in non-contact mode. The collected output from the scan in contact mode is used to calculate and generate an image of a topography of the sample upper surface, while the collected output from the scan in non-contact mode is used to calculate and generate an image of a physical property of the sample material. Where the sample material is conductive, this method may be used to image electrical conductivity or resistivity. Where the sample material is dielectric, this method may be used to image dielectric polarization.

Although this invention has been described with respect to certain preferred embodiments, various other embodiments and various changes and modifications to the disclosed embodiment(s) will become apparent to those skilled in the art. All such other embodiments, changes, and modifications are intended to come within the spirit and scope of the appended claims.

What is claimed is:

1. A method of using an atomic force microscope system to image at least one electrostrictive property of a dielectric sample material the atomic force microscope system comprising:

A cantilever including a non-magnetic reflective surface, a first end and a second end, wherein the first end has a pointed tip and the second end defines a length between the first end and the second end;

A scanner coupled to a scanning controller and the second end of the cantilever, wherein the cantilever is positioned such that the pointed tip is adjacent to the sample upper surface, the scanning controller providing a scanner signal to the scanner to position the scanner and the cantilever such that the pointed tip is able to move across at least a portion of the sample upper surface;

A laser positioned to emit a light;

A photodetector;
A generator to generate a single-coil excitation signal;
An electromagnetic coil coupled to the generator to receive the single coil-excitation signal; and
A single phase sensitive detector;
the method comprising:
  placing the dielectric sample material near the electromagnetic coil;
  supplying the single coil excitation signal having a predetermined amplitude and a predetermined frequency to the electromagnetic coil such that the single coil-excitation signal creates a single time-varying magnetic field;
  positioning the dielectric sample material such that the dielectric sample material intersects the single time-varying magnetic field, whereby the single time-varying magnetic field generates a first amount of electrostrictive strain in the dielectric sample material;
  focusing the laser on the reflective surface of the cantilever, wherein the cantilever comprises a magnetic pointed tip;
  raster-scanning the dielectric sample material with the magnetic pointed tip of the cantilever such that the magnetic pointed tip is in contact with a sample upper surface, wherein the cantilever is coupled to the scanner, wherein the electrostrictive strain causes the cantilever to deflect toward or away from the sample upper surface;
  detecting a portion of the laser that is reflected from the reflective surface using the photodetector;
  collecting an output of the photodetector and the amplitude of the single coil-excitation signal using the single phase sensitive detector; and
  generating at least one electrostrictive property image by comparing the output of the photodetector and the amplitude of the single coil-excitation signal, wherein the at least one electrostrictive property image is generated independently of the scanner signal.

2. The method of claim 1 wherein the electrostrictive property image and a topography image are obtained simultaneously.

3. The method of claim 1 further comprising varying the second magnetic field by altering at least one of the amplitude and the frequency of the single coil-excitation signal, thereby generating a second amount of electrostrictive strain in the sample material.

4. A method of using an atomic force microscope system to image at least one dielectric polarization property of a dielectric sample material having a first amount of dielectric polarization the atomic force microscope system comprising:
  A cantilever including a non-magnetic reflective surface, a first end and a second end, wherein the first end has a pointed tip and the second end defines a length between the first end and the second end;
  A scanner coupled to a scanning controller and the second end of the cantilever, wherein the cantilever is positioned such that the pointed tip is adjacent to the sample upper surface, the scanning controller providing a scanner signal to the scanner to position the scanner and the cantilever such that the pointed tip is able to move across at least a portion of the sample upper surface;
  A laser positioned to emit a light;
  A photodetector;
  A generator to generate a single-coil excitation signal;
  An electromagnetic coil coupled to the generator to receive the single coil-excitation signal; and
  A single phase sensitive detector;
the method comprising:
  placing the dielectric sample material near the electromagnetic coil;
  supplying the single coil excitation signal having a predetermined amplitude and a predetermined frequency to the electromagnetic coil such that the single coil-excitation signal creates a single time-varying magnetic field;
  positioning the dielectric sample material such that the dielectric sample material intersects the single time-varying magnetic field, whereby the single time-varying magnetic field alters the first amount of dielectric polarization in the dielectric sample material to generate a second amount of dielectric polarization;
  positioning the cantilever at a predetermined distance above a sample upper surface, wherein the cantilever comprises a magnetic pointed tip;
  focusing the laser on the reflective surface of the cantilever;
  raster-scanning the dielectric sample material, wherein the cantilever is coupled to the scanner, wherein interactions between dipoles in the dielectric sample material and the single time-varying magnetic field cause the cantilever to deflect toward or away from the sample upper surface;
  detecting a portion of the laser that is reflected from the reflective surface using the photodetector;
  collecting an output of the photodetector and the amplitude of the single coil-excitation signal using the single phase sensitive detector; and
  generating at least one dielectric polarization property image by comparing the output of the photodetector and the amplitude of the single coil-excitation signal, wherein the at least one dielectric polarization property image is generated independently of the scanner signal.

5. The method of claim 4 further comprising obtaining a topography image by raster-scanning the dielectric sample material with the magnetic pointed tip of the cantilever such that the magnetic pointed tip is in contact with the sample upper surface.

6. The method of claim 4 further comprising varying the second magnetic field by altering at least one of the amplitude and the frequency of the single coil-excitation signal, thereby generating a third amount of dielectric polarization in the dielectric sample material.

* * * * *